United States Patent [19]
Marshall

[11] 3,841,380
[45] Oct. 15, 1974

[54] ADAPTER FOR PORTABLE POWER-OPERATED TIRE REMOVING TOOL

[76] Inventor: Don J. Marshall, Box 410 Rt. 6, Edgewater, Md. 21037

[22] Filed: Sept. 29, 1972

[21] Appl. No.: 293,313

[52] U.S. Cl. .............................................. 157/1.26
[51] Int. Cl. ............................................ B60c 25/06
[58] Field of Search ............. 157/1, 1.1, 1.11, 1.17, 157/1.26, 1.33

[56] References Cited
UNITED STATES PATENTS
3,006,404   10/1961   Marshall............................. 157/1.26
FOREIGN PATENTS OR APPLICATIONS
698,887   10/1953   Great Britain...................... 157/1.26

*Primary Examiner*—Al Lawrence Smith
*Assistant Examiner*—Harold P. Smith, Jr.
*Attorney, Agent, or Firm*—William J. Dick

[57] ABSTRACT

An adapter for a portable power-operated tool for breaking the bond between a tire rim and the bead of the tire mounted thereon, the adapter being particularly useful with rims comprising an annulus including a wheel disk or web interiorly of the annulus and having at least one aperture therein, usually centrally located. The adapter includes a beam having at least one horizontally extending flange and a projecting web, the flange having an axially extending slot therein to accommodate an axially slidable clamp which passes through the slot in the beam. Apparatus is provided for adjustably securing the clamp to the flange. The clamp includes a pivot plate which projects substantially parallel to the flange but spaced therefrom a distance greater than the thickness of a wheel disk. An offset portion of the beam extends therefrom and includes a yoke with means for quickly attaching and detaching the power unit to the yoke.

14 Claims, 5 Drawing Figures

ADAPTER FOR PORTABLE POWER-OPERATED TIRE REMOVING TOOL

The purpose of this abstract is to enable the public and the Patent Office to determine rapidly the subject matter of the technical disclosure of the application. This abstract is neither intended to define the invention of the application nor is it intended to be limiting as to the scope thereof.

SUMMARY OF THE INVENTION AND STATE OF THE PRIOR ART

The present invention relates to portable power operated tools for breaking the bond between a tire rim and the bead of a tire mounted thereon, and more particularly relates to an adapter for a power tool for breaking the bond between the tire rim and the tire bead in which the rim includes a disk or web substantially closing the space intermediate the annular rim form.

In recent years there have been innovations in the mounting of truck tires on rims and changes in the basic rim structure which while affording a greater margin of safety have created problems with changing the tire or removing it from the rim structure. In previous portable power operated tire removing tools, such as illustrated in U.S. Pat. No. 2,728,383 issued on Dec. 27, 1955 to the present inventor, and U.S. Pat. No. 2,844,194 issued on July 22, 1958 to the present inventor, a portable power operated tire removing tool is illustrated in which the tire bead is removed from the flange of the tire rim by a wedge-shaped power actuated tool, the tool being also clamped through the rim adjacent the opposite flanges of the rim thereby providing a pinching action when the tool is energized. With more recent rims, while this tool is still practical where the rim includes a disk or web which fills in the wheel rim well, only those rims with large enough holes allow the hook to pass through to form what are essentially spokes in the wheel. In recent years the holes have been made smaller and smaller and in some instances have been eliminated entirely except for the one large hole in the center where the axle end passes through.

Thus with the portable power operated tool removing tool described in the above identified patents, it is impossible to separate the tire bead from those rims having a substantially closed disk.

Additionally, many of the truck tires are mounted on the rim by locking rings which help to maintain the tire bead in position when inflated and to give added support to the tire bead and thus the tire when the wheel is on the road. The conventional method of removing the tire is by the use of a large sledge or hammer and wedge, many times the hammer or sledge being used missing the tire and striking either the rim or the lock ring thereby creating dents in the lock ring root channel causing improper seating of the lock ring relative to the rim. Often dents in the lock ring root channel cause the lock rings to fly off when the tire is being filled, the lock rings separating from the tire at great velocities resulting oft times in injury to the person inflating the tire. Of course, such dents can also cause spot loading of the root channel of the lock ring which causes said root channel to split under the pressure of the rolling action of the wheel resulting in tire blow-off and in many instances resulting in vehicular accidents.

In view of the above it is a principal object of the present invention to provide an adapter which is useful for tire removal in conjunction with rims having webs or disks, with the power unit of the type described in the above identified Marshall patents, to break the bead of the tire from the rim.

Still another object of the present invention is to provide a novel adapter including a beam which presses against the web of the rim and which clamps thereto while connecting in a quick and easy manner to the power unit.

Yet another object of the present invention is to provide a novel adapter which is easily adjustable so as to accommodate wheels of varying diameter.

Still another object of the present invention is to provide a novel adapter for use in conjunction with portable power operator tire removing tools which is easily attached to and removed from the power unit of the tool.

Still another object of the present invention is to provide a novel adapter for existing tire bead loosening tools which is economical in construction while being simple to use and connect to the power energized portion of the tool.

Other objects and a more complete understanding of the invention may be had by referring to the following specification and claims taken in conjunction with the accompanying drawings in which:

Figure 1:
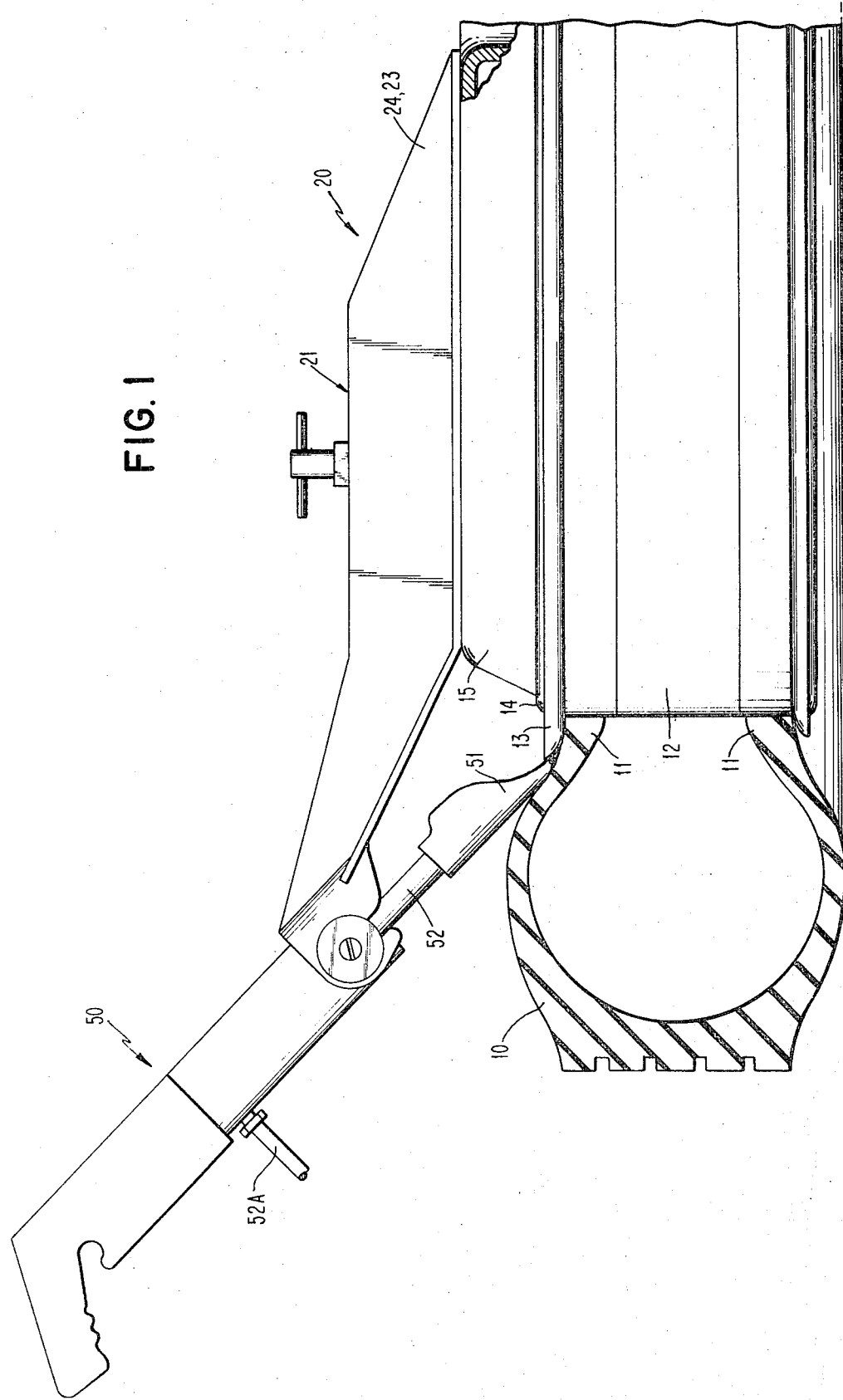
FIG. 1 is a fragmentary schematic view of the power unit and novel adapter of the present invention and the manner of clamping the same to the web or wheel disk of the rim of a tire for breaking the bead of the tire.
Figure 2:
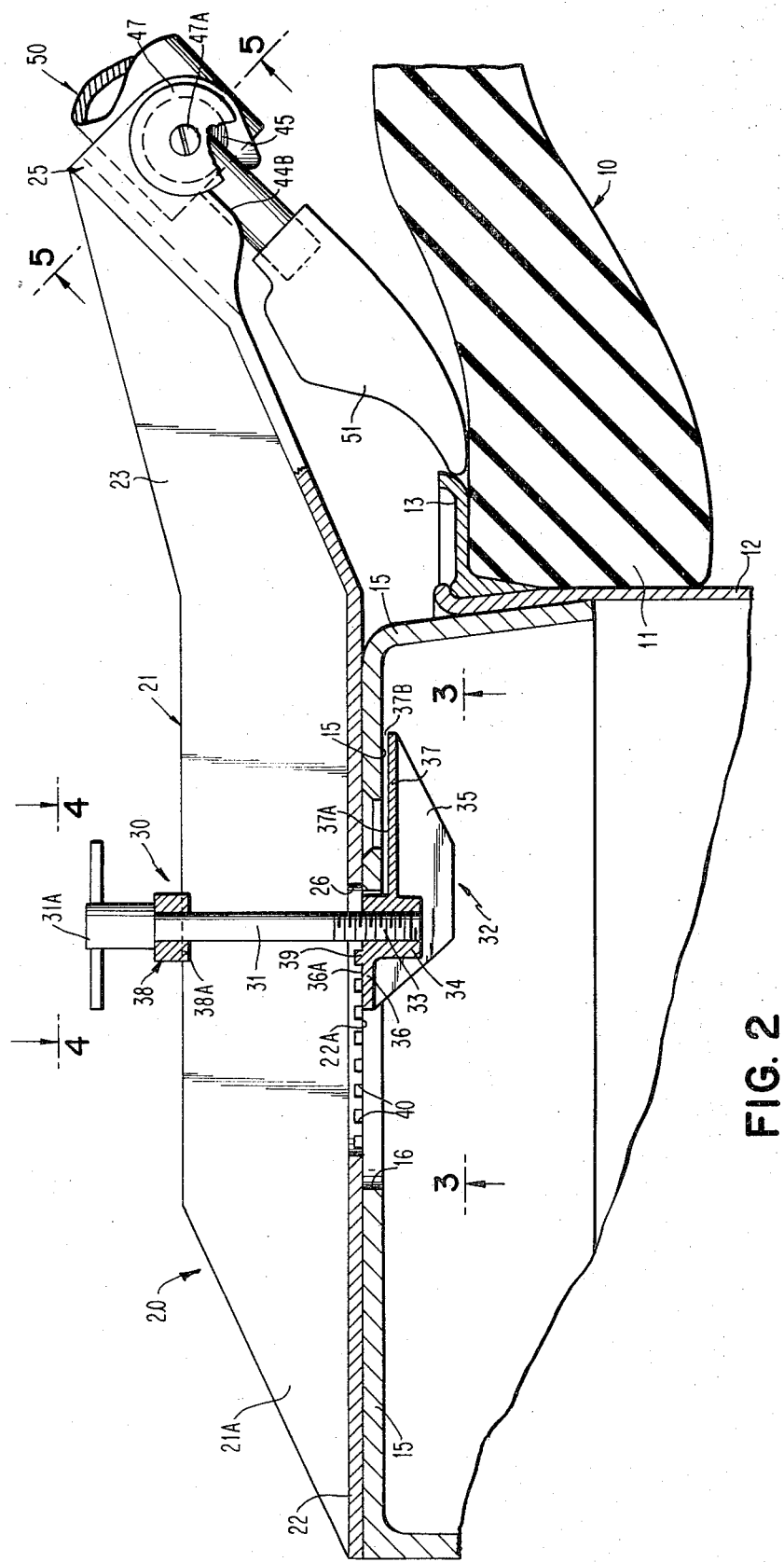
FIG. 2 is an enlarged fragmentary sectional view in side elevation of the adapter of the present invention.

Referring now to the drawing, and especially FIGS. 1 and 2 thereof, a pneumatic tire 10 which is provided on its inner circumference with a bead 11 is shown in engagement with an annulus (or rim) 12 and bearing against a split lock ring 13, which overlies the bead 11 and is held in place by a hook 14 (see FIG. 2) on the termini of the rims. Inside the annulus 12 and joining opposite sides thereof is a web or wheel disk 15 having a central aperture 16 therein to allow the vehicular axle to pass therethrough. Mounted on the wheel disk or web 15 of the annulus 12 is a novel adapter 20 constructed in accordance with the present invention, the adapter being connected to a power unit 50 which may be of the pneumatic or hydraulic type. As illustrated, the power unit 50 includes a bead breaking wedge 51 which is connected to a piston rod 52 actuable by the power unit 50.

The power unit 50 may be similar to the power units illustrated in U.S. Pat. No. 2,728,383 issued on Dec. 27, 1955, or the power unit illustrated in U.S. Pat. No. 2,844,194 issued on July 22, 1958 to Don J. Marshall, the present inventor. The pertinent parts of said above identified patents relative to the power unit, is incorporated herein and require, therefore, no additional explanation with the exception that each includes a piston (not shown) which is connected to the piston rod 52 and which may be energized as by a pneumatic line 52A connected to the standard garage air source. Upon energization the wedge 51 moves between the bead 11 and split lock ring 13, effecting a separation of the tire from the annulus 12. Release of pressure, thereafter, in the power unit 50 causes retraction of the wedge 51, and, by the design of the adapter of the present invention, permits rotation and movement of the tool circumferentially of the tire to break the bead from the lock ring 13 at different locations.

Figure 4:
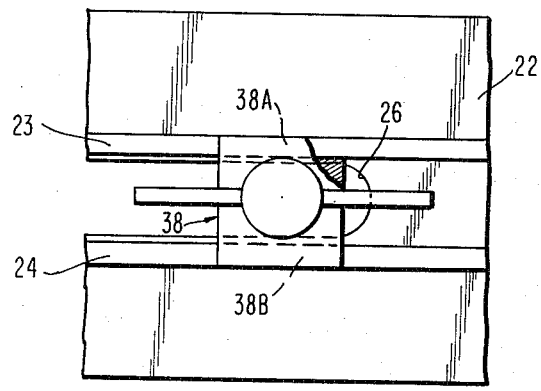
FIG. 4 is a fragmentary sectional view taken along 4—4 of FIG. 2.

In accordance with the invention, the adapter provides a lock on the rim against which the power unit 50 may act so as to effect separation of the bead 11 of the tire 10 from the rim or annulus 12. To this end, and referring first to FIG. 2, the adapter 20 comprises a beam 21 having a flange 22 and, in the illustrated instance, a pair of projecting, upstanding webs 23 and 24 (see FIG. 4) the upper surfaces 23A and 24A of which serve as tracks in a manner which will be more fully explained hereinafter. At one end of the beam 21 is an offset portion 25 which is offset from the horizontal at an angle of approximately 40° to provide a mount for the power unit 50. Intermediate the webs 23 and 24 and in the flange 22 of the beam 21 is an axially extending slot 26 which receives clamping means 30 which cooperates with the flange 22 of the beam and the wheel disk 15 to clamp the beam to the disk through the central aperture 16 thereof.

Figure 3:
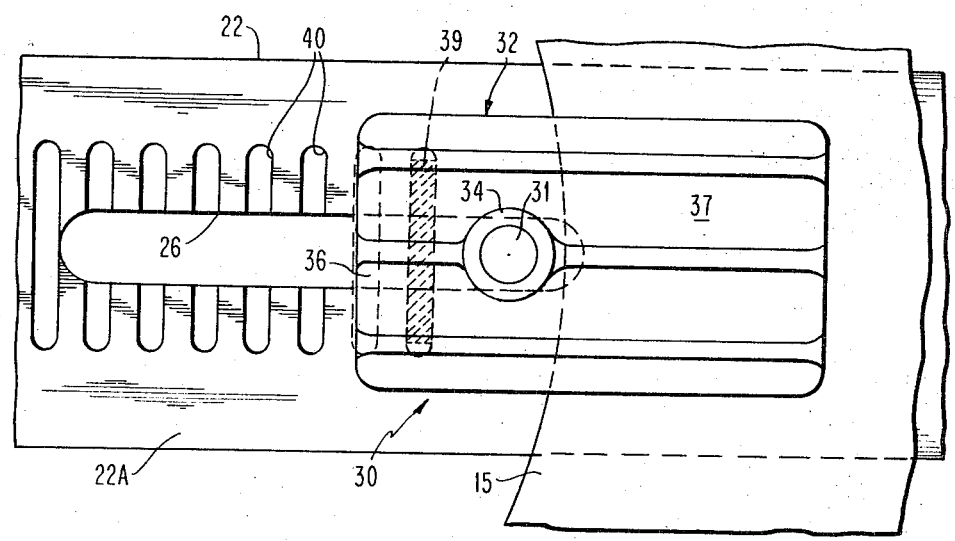
FIG. 3 is a fragmentary sectional view taken along line 3—3 of FIG. 2.

The clamping means 30 while connecting the beam 21 to the wheel disk 15, permits of sufficient vertical play or clearance with respect to the wheel disk to permit rotation of the adapter 20, with the power unit attached, to permit location of the wedge 51 of the power unit 50 to any desired location circumscribing the annulus 12 to break the bead 11 of the tire 10 from the split ring 13. To this end, and referring to FIGS. 2, 3 and 4, the clamping means 30 comprises a post 31 which passes through the slot 26 in the beam and connects to a shoe 32 by threads 33 in a threaded sleeve portion 34 of the shoe 32. As illustrated, the shoe 32 includes a plurality of stiffening webs 35 and a pair of axially offset, radially projecting flanges 36 and 37 respectively, the flange or pivot plate 37 being displaced axially from the upper surface 36A of the opposite flange or pivot plate 37 to provide clearance 37B between the upper surface 37A of the flange 37 from the bottom surface 15A of the wheel disk 15. The clearance provides sufficient room to permit rotation of the adapter 20 so as to position the power unit 50 at any desired circumferential location of the tire, without excess frictional engagement.

In order to permit proper placement of the clamping means relative to the beam 21, along its axial length, and then to permit locking of the clamping means 30 relative to the beam 21, means are provided to facilitate sliding of the post 31 and shoe longitudinally of the beam and then to lock the shoe against the beam. To this end, and referring to FIGS. 3 and 4, the post 31 passes through a bushing 38 having lower recessed portions 38A and 38B which cooperate with the upper surfaces 23A, 24A of the webs 23 and 24 to thereby permit the webs surfaces to act as tracks for moving the clamping means longitudinally of the beam 21. The post 31 includes a handle portion 31A which permits, by simple rotation against the bushing, which bears against the tracks, to provide sufficient clearance between the upper surface 36A of the flange 36 of the shoe 32 to permit such longitudinal displacement for proper centering of the beam 21 relative to the central aperture 16 in the disk 15.

After the proper positioning of the shoe 32 relative to the wheel disk 15, it is desirable to clamp the clamping means 30 in proper position affixed to the beam 21. To this end, and as best illustrated in FIG. 2, the upper flange 36 of the shoe 32 includes a plurality of lugs 39 which extend transversely of the flange 22 of the beam 21. The lugs are adapted to register and cooperate with recesses 40 in the lower surface 22A of the flange 22 and are spaced axially of the flange an equal distance with respect to the lugs 39. Thus rotation of the handle 31A of the post 31 tightens the shoe against the surface 22A of the flange 22 without effecting a mating engagement of the upper surface 37A of the enlarged flange 37 against the under surface of the wheel disk 15, thereby defining the space 37B therebetween.

The clamping means 30 while providing sufficient clearance for rotation of the beam 21 of the adapter 20 provides the necessary fulcrum in conjunction with the end 21A of the beam to permit loading of the wedge 51 against the bead 11 of the tire to break the bead away from the lock ring 13. To this end, it should be recognized that the flange 37 acts as a pivot plate, for as pressure of the wedge against the bead increases, the beam will tend to lift (i.e., the off set portion 25 will tend to raise) until the flange 37, acting as a pivot plate, acts against the lower surface of the wheel disk 15.

In order to effect quick and easy attachment and separation of the power unit 50 to the offset portion 25 of the beam 21, quick acting connecting means 40 is provided. To this end, and referring first to FIG. 5, the offset portion 25 includes a yoke or clevis 41 having spaced apart legs 42 and 43 each including aligned aperture 42A, 43A respectively therein. Extending from the exterior of each of the legs and joining the apertures are slots 44A and 44B respectively. The power unit 50 includes a pair of radially projecting pivot pins 53 and 54 which are dimensioned to be fittable into the slots 44A, 44B and to nest in the apertures 42A and 43A respectively.

Figure 5:
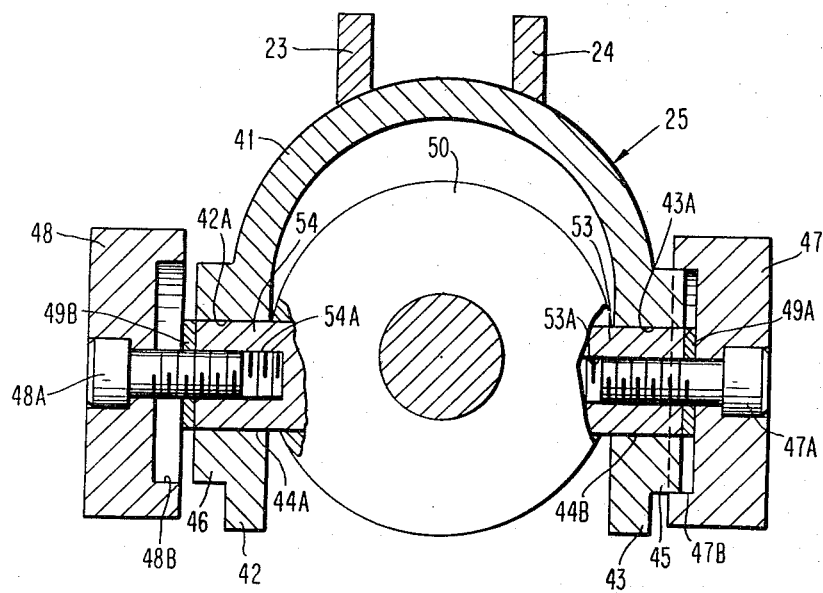
FIG. 5 is a fragmentary sectional view taken along line 5—5 of FIG. 2.

It is evident that with nothing more the power unit would fall free from the apertures and slots absent some means to lock the same to the yoke 41, unless of course the wedge 51 applied pressure against the bead 11 of the tire 10. In order to clamp the power unit 50 to the offset portion 25 so that it does not fall free, each of the legs 42, 43 of yoke or clevis 41 includes an outward projection or raised boss 45 and 46 respectively. Hand wheels 47 and 48 each having central screws 47A and 48A respectively cooperate with threads in apertures 53A, 54A in the pivot pins 53 and 54 and effect, by simple rotation of the hand wheels 47 and 48, a tightening of the hand wheels onto the bosses. As illustrated in FIG. 5 the hand wheels include a recessed portion 47B, 48B including a skirt which is dimensioned to embrace the raised bosses 45 and 46 respectively. Friction washers 49A, 49B are fitted on each of the screws 47A, 48A so as to provide the necessary friction between the hand wheels and the pivot pins. Inasmuch as the hand wheels circumscribe the raised boss, the power unit 50 is then captured in the clevis or yoke 41 while having a certain degree of freedom about the pivot pins 53 and 54. Additionally, besides acting as quick acting connecting means, the hand wheels serve the function of inhibiting spreading of the yoke 41 under high load conditions.

Thus the apparatus of the present invention provides a simple and yet effective adapter which may be easily connected to the disk or web of a rim to facilitate the removal of a tire by a standard power unit.

Although the invention has been described with a certain degree of particularity, it is understood that the present disclosure has been made only by way of example and that numerous changes in the details of construction and the combination and arrangement of parts and the mode of operation may be made without departing from the spirit and the scope of apertures invention as hereinafter claimed.

What is claimed is:

1. An adapter for a portable power-operated tool for breaking the bond between a tire rim and the bead of a tire mounted thereon, said rim comprising an annulus including a wheel disk interiorly of said annulus and including at least one aperture therein; said adapter comprising:

a beam for contacting a said rim and including an axially extending slot therein;

axially slidable clamping means passing through said slot in said beam and a said aperture in a said wheel disc and including means to adjustably clamp said clamping means to said beam to inhibit vertical and horizontal displacement of said clamping means relative to said beam while permitting said beam to freely rotate about the central aperture of said wheel disk;

an offset portion extending from said beam and including a yoke, and means for clamping said tool to said yoke.

2. An adapter in accordance with claim 1 wherein said yoke comprises a pair of spaced apart legs and an aperture in each of said legs, slots extending from the exterior of said legs to said apertures and adapted to receive pivot pins projecting from said tool dimensioned to be fittable into said slots and apertures, and means to clamp said pivot pins in said apertures.

3. An adapter in accordance with claim 2 wherein said yoke includes a raised boss on the exterior of each of said legs circumscribing said apertures, a hand wheel on each of said bosses each including means extending into said apertures to connect to said pivot pins.

4. An adapter in accordance with claim 3 wherein each hand wheel includes a skirt portion dimensioned to circumscribe each of said bosses.

5. An adapter in accordance with claim 1 wherein said clamping means includes a post and a shoe, said shoe including a pivot plate projecting from said post substantially parallel to said beam but spaced therefrom a distance greater than the thickness of a wheel disk and an offset portion for contacting the lower surface of said beam, recesses in one of said offset portion and the contacting surface of said beam, and cooperating lugs in the other whereby at least axial displacement of said shoe relative to said beam is inhibited.

6. An adapter in accordance with claim 5 wherein said beam includes a pair of upstanding, spaced apart webs forming guide tracks on opposite sides of said slot; said post projecting upwardly from said shoe through said slot, and slide means on said post for cooperation with said tracks to thereby permit axial displacement of said shoe and post.

7. A power operated tool for breaking the bond between a tire rim including a wheel disk and a central aperture therein and the bead of a tire mounted thereon, said tool comprising: a beam having contact means for contact with a said rim, clamping means for connecting said beam to said wheel disk through the central aperture thereof, said clamping means includes a post and a shoe; an axially extending slot in said beam, and said post projecting upwardly through said slot with said shoe connected to said post and underlying said slot in said beam; first and second flanges on said shoe projecting radially with respect to said post and on opposite sides thereof, at least said second flange being spaced a distance greater than the thickness of a wheel disk, and means to lock the first of said flanges to the contact means of said beam to inhibit axial displacement of said shoe relative to said beam while permitting said beam to freely rotate about said central aperture of said disk; an offset portion of said beam having a yoke thereon; and a power unit including a wedge for breaking the bead of a tire mounted on a rim, and means pivotally mounting said power unit to said yoke.

8. A power operated tool in accordance with claim 7, wherein said first flange is axially offset from said second flange.

9. A power operated tool in accordance with claim 8 wherein said contact means of said beam comprises a flange, including recesses in one of said flange of said beam and said first flange and cooperating lugs on the other.

10. A power operated tool in accordance with claim 9 including a pair of upstanding, spaced apart webs on said beam forming guide tracks on opposite sides of said slot; and slide means on said post for cooperation with said tracks to thereby permit axial displacement of said shoe and post.

11. A power operated tool in accodance with claim 7 including quick acting connecting means coupling said power unit to said yoke.

12. A power operated tool in accordance with claim 11 wherein said yoke comprises a pair of spaced apart legs and an aperture in each of said legs, slots extending from the exterior of said legs to said apertures; pivot pins projecting from said tool and dimensioned to fittable into said slots and apertures, and means to clamp said pivot pins in said apertures.

13. A power operated tool in accordance with claim 12 wherein said yoke includes a raised boss on the exterior of each of said legs circumscribing said apertures, a hand wheel on each of said bosses each including means extending into said apertures to connect to said pivot pins.

14. A power operated tool in accordance with claim 13 wherein each hand wheel includes a skirt portion dimensioned to circumscribe each of said bosses.

* * * * *